United States Patent
Senthil (10) Patent No.: US 11,532,023 B2
(45) Date of Patent: Dec. 20, 2022

(54) SYSTEM AND METHOD FOR STREAMLINING A CHECKOUT PROCESS OF E-COMMERCE WEBSITES

(71) Applicant: Kumar N Senthil, Sammamish, WA (US)

(72) Inventor: Kumar N Senthil, Sammamish, WA (US)

(73) Assignee: Kumar N Senthil, Sammamish, WA (US)

( * ) Notice: Subject to any disclaimer, the term of this patent is extended or adjusted under 35 U.S.C. 154(b) by 60 days.

(21) Appl. No.: 17/183,402

(22) Filed: Feb. 24, 2021

(65) Prior Publication Data
US 2022/0270147 A1    Aug. 25, 2022

(51) Int. Cl.
| | |
|---|---|
| *G06Q 30/06* | (2012.01) |
| *G06F 16/951* | (2019.01) |
| *G06F 9/451* | (2018.01) |
| *G06F 16/9532* | (2019.01) |
| *G06F 9/54* | (2006.01) |
| *G06Q 20/12* | (2012.01) |

(52) U.S. Cl.
CPC ......... *G06Q 30/0613* (2013.01); *G06F 9/451* (2018.02); *G06F 9/547* (2013.01); *G06F 16/951* (2019.01); *G06F 16/9532* (2019.01); *G06Q 30/0633* (2013.01); *G06Q 30/0641* (2013.01); *G06Q 20/12* (2013.01)

(58) Field of Classification Search
CPC .............................................. G06Q 30/06–08
See application file for complete search history.

(56) References Cited

U.S. PATENT DOCUMENTS

| | | | |
|---|---|---|---|
| 7,197,475 B1 | 3/2007 | Lorenzen et al. | |
| 2002/0038255 A1* | 3/2002 | Tarvydas | G06Q 30/0635 705/26.43 |
| 2005/0149854 A1* | 7/2005 | Pennell | G06F 16/957 707/E17.119 |
| 2005/0198563 A1* | 9/2005 | Kristjansson | G06F 40/174 715/224 |

(Continued)

OTHER PUBLICATIONS

What is batch processing?, TIBCO.*

*Primary Examiner* — Ming Shui
(74) *Attorney, Agent, or Firm* — Jason C. Cameron (57) ABSTRACT

System and method to streamline the checkout process of e-commerce websites is disclosed. The processing subsystem includes a web crawler to browse the e-commerce websites, a website analysis module to analyze checkout data entry forms and web UI of the corresponding e-commerce websites browsed by the web crawler. The processing subsystem includes a classification module to classify the checkout data entry forms into fields based on a form data model. The classification module maps user information with classified fields using a natural language mapping technique to obtain a mapped model. The processing subsystem includes a fingerprinting module to fingerprint configurations and checkout pages of the corresponding e-commerce websites to obtain fingerprinting data. The processing subsystem includes a checkout processing module to generate a one-click checkout flow for an e-commerce website selected from the e-commerce websites. The one-click checkout flow is generated based on the fingerprinting data and the mapped model.

15 Claims, 6 Drawing Sheets

(56) References Cited

U.S. PATENT DOCUMENTS

| | | | | |
|---|---|---|---|---|
| 2005/0257134 A1* | 11/2005 | Goodman | ............ | G06F 40/174 |
| | | | | 706/12 |
| 2006/0230033 A1* | 10/2006 | Halevy | ................ | G06F 40/174 |
| 2007/0022085 A1* | 1/2007 | Kulkarni | ............ | G06F 16/9566 |
| | | | | 707/E17.115 |
| 2008/0172598 A1* | 7/2008 | Jacobsen | ............ | G06Q 30/0613 |
| | | | | 715/224 |
| 2011/0276414 A1* | 11/2011 | Subbarao | ............ | G06Q 20/102 |
| | | | | 705/40 |
| 2017/0236196 A1* | 8/2017 | Isaacson | ................ | G06Q 20/12 |
| | | | | 705/14.51 |
| 2018/0336279 A1 | 11/2018 | Ahern et al. | | |
| 2020/0004880 A1 | 1/2020 | Sharshevsky et al. | | |

\* cited by examiner

SYSTEM AND METHOD FOR STREAMLINING A CHECKOUT PROCESS OF E-COMMERCE WEBSITES

FIELD OF INVENTION

Embodiments of the present disclosure relate to e-commerce platform and more particularly to a system and a method for streamlining checkout process of e-commerce websites.

BACKGROUND

A web crawler is an extremely useful tool for certain tasks such as web indexing and updating web content. The web crawler starts with a lists of uniform resource locators (URLs) to visit. As the web crawler visits such URLs, the web crawler identifies all the hyperlinks in the page and adds them to the list of URLs to visit, storing the list in a data structure. However, one major drawback of using web crawlers is that access to certain e-commerce webpages, such as checkout pages may not be easily accessible because in order to access a checkout page, an associated shopping cart must have an item, such as a product. Such mechanism does not allow a web crawler to access all pages of e-commerce websites.

Most of the e-commerce websites have a large number of clicks to complete the checkout process. Some of the larger players in the market have invested a lot in streamlining their checkout process. However small e-commerce websites do not have the same level investment or leverage to streamline the checkout process. Also, such mechanism involves cumbersome methods for the customers to enter same information namely the shipping address, billing address, payment information and shipping method to complete their purchase for every single website they transact with. Besides that, due to the typical difficulty in form entry and validation, the conversion rate during the last part of the checkout funnel is affected in negative ways for the merchants and also a frustrating experience for the customers.

Hence, there is a need for an improved system and method to streamline the checkout process for e-commerce websites to address the aforementioned issue(s).

BRIEF DESCRIPTION

In accordance with an embodiment of the present disclosure, a system to streamline the checkout process of e-commerce website is provided. The system includes a user interface and an application programming interface configured to enable communication with the one or more e-commerce websites. The system also includes a processing subsystem hosted on a server and configured to execute on a network to control bidirectional communications among a plurality of modules. The processing subsystem includes a web crawler configured to systematically browse the one or more e-commerce websites. The processing subsystem also includes a website analysis module configured to analyze one or more checkout data entry forms and web UI of the corresponding one or more e-commerce websites browsed by the web crawler. The processing subsystem further includes a classification module configured to classify the one or more checkout data entry forms into one or more fields based on a form data model. The classification module is also configured to map user information with one or more classified fields using a natural language mapping technique to obtain a mapped model. The processing subsystem further includes a fingerprinting module configured to fingerprint a plurality of configurations and a plurality of checkout pages of the corresponding one or more e-commerce websites to obtain fingerprinting data. The processing subsystem further includes a checkout processing module configured to generate a one-click checkout flow for an e-commerce website selected from the one or more e-commerce websites browsed by the web crawler, where the one-click checkout flow is generated based on the fingerprinting data and the mapped model.

In accordance with another embodiment of the present disclosure, a method to streamline the checkout process of e-commerce websites is provided. The method includes enabling, by a user interface and an application programming interface, communication with one or more e-commerce websites. The method also includes executing, by a processing subsystem hosted on a server, on a network to control bidirectional communications among a plurality of modules. The method further includes crawling, by a web crawler, the one or more e-commerce websites systematically. The method further includes analyzing, by a website analysis module, one or more checkout data entry forms and web UI of the corresponding one or more e-commerce websites crawled by the web crawler. The method further includes classifying, by a classification module, the one or more checkout data entry forms into one or more fields based on a form data model. The method further includes mapping, by the classification module, user information with one or more classified fields using a natural language mapping technique to obtain a mapped model. The method further includes fingerprinting, by a fingerprinting module, a plurality of configurations and a plurality of checkout pages of the corresponding one or more e-commerce websites to obtain fingerprinting data. The method further includes generating, by a checkout processing module, a one-click checkout flow for an e-commerce website selected from the one or more e-commerce websites browsed by the web crawler, wherein the one-click checkout flow is generated based on the fingerprinting data and the mapped model.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method to streamline the checkout process of e-commerce platform. The system includes a user interface and an application programming interface configured to enable communication with the one or more e-commerce websites. The system also includes a processing subsystem hosted on a server and configured to execute on a network to control bidirectional communications among a plurality of modules. The processing subsystem includes a web crawler configured to systematically browse the one or more e-commerce websites. The processing subsystem also includes a website analysis module configured to analyze one or more checkout data entry forms and web UI of the corresponding one or more e-commerce websites browsed by the web crawler. The processing subsystem further includes a classification module configured to classify the one or more checkout data entry forms into one or more fields based on a form data model. The classification module is also configured to map user information with one or more classified fields using a natural language mapping technique to obtain a mapped model. The processing subsystem further includes a fingerprinting module configured to fingerprint a plurality of configurations and a plurality of checkout pages of the corresponding one or more e-commerce websites to obtain fingerprinting data. The processing subsystem further includes a checkout processing module configured to generate a one-click checkout flow for an e-commerce website selected from the one or more e-commerce websites browsed by the web crawler, where the one-click checkout flow is generated based on the fingerprinting data and the mapped model.

Figure 1:
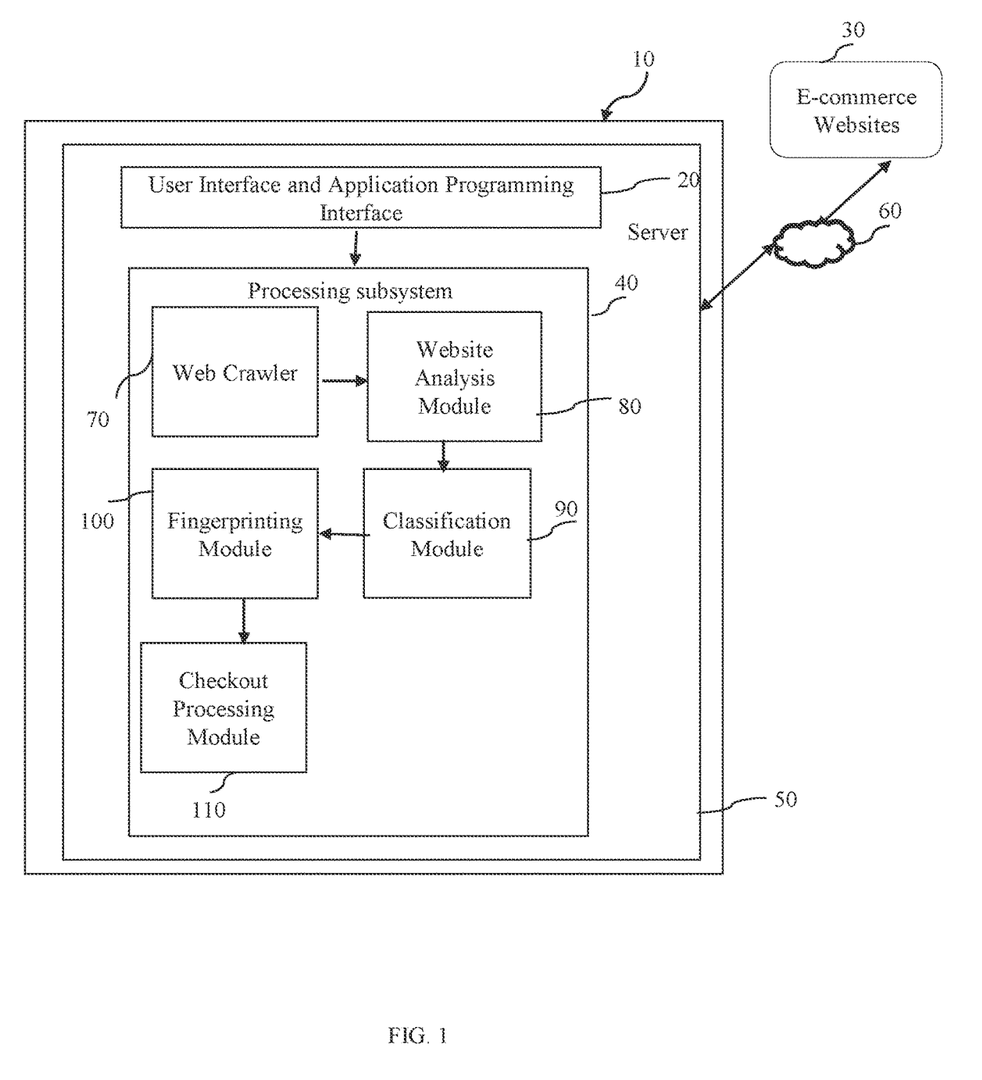
FIG. 1 is a block diagram representation of system for streamlining the checkout process of e-commerce websites in accordance with an embodiment of the present disclosure.

FIG. 1 is a block diagram representation of a system to streamline a checkout process of e-commerce websites in accordance with an embodiment of the present disclosure. The system 10 includes a user interface (UI) and an application programming interface 20 configured to enable communication with one or more e-commerce websites 30. As used herein, the e-commerce website is a site that sells products and services through means of the data transfer and funds over the internet. As used herein, UI and the application programming interface (API) is a computing interface that defines interactions between multiple software intermediaries. The API defines the kinds of calls or requests which may be made, how to make them, the data formats that should be used, the conventions to follow, or the like. In one embodiment, the API may be remote APIs or web APIs. The remote APIs allow to manipulate remote resources through protocols, specific standards for communication that further allow different technologies to work together, regardless of language or platform. The web APIs are the defined interfaces through which interactions happen between an enterprise and applications that use its assets, which also is a Service Level Agreement (SLA) to specify the functional provider and expose the service path or URL for its API users.

The system 10 also includes a processing subsystem 40 hosted on a server 50. In one embodiment, the server 50 may be a cloud-based server. In another embodiment, parts of the server 50 may be a local server coupled to a user device. The processing subsystem 40 is configured to execute on a network 60 to control bidirectional communications among a plurality of modules. In one embodiment, the network 60 may include one or more terrestrial and/or satellite networks interconnected to communicatively connect the user device to web server engine and a web crawler. In one example, the network 60 may be a private or public local area network (LAN) or Wide Area Network (WAN), such as the Internet. In another embodiment, the network 60 may include both wired and wireless communications according to one or more standards and/or via one or more transport mediums. In one example, the network 60 may include wireless communications according to one of the 802.11 or Bluetooth specification sets, or another standard or proprietary wireless communication protocol. In yet another embodiment, the network 60 may also include communications over a terrestrial cellular network, including, a GSM (global system for mobile communications), CDMA (code division multiple access), and/or EDGE (enhanced data for global evolution) network.

The processing subsystem 40 includes the web crawler 70 which is configured to systematically browse the one or more e-commerce websites. More specifically, the web crawler 70 is used to update web content of the one or more websites or indices of other sites' web content. The web crawler 70 copy pages for processing by a search engine, which indexes the downloaded pages so that users may search more efficiently. Further, the web crawler 70 is configured to load the URLs from a database of e-commerce websites and crawl checkout pages of the corresponding one or more e-commerce websites. The processing subsystem 40 also includes a website analysis module 80 which is configured to analyze one or more checkout data entry forms and web UI of the corresponding one or more e-commerce websites browsed by the web crawler 70. As used herein, the checkout data entry form data entry form is often used to input data, which has previously been collected, into a database. Often some 'validation' checks are made before sending in order to make sure the data format is valid and within range. Similarly, the web UI (user interface) deals with the controls that people use to interact with a website, including button displays and gesture controls. The website analysis module 80 is also configured to analyze a type of content, fields and control configurations of the data entry form used at the time of check on the one or more e-commerce websites. In one embodiment, the website analysis module analyzes one or more parameters such as first name and last name of the user, shipping address, billing address, payment methods, shipping methods, address restrictions ex: PO Box not supported by certain merchants or the like.

Furthermore, the processing subsystem 40 includes a classification module 90 which is configured to classify the one or more checkout data entry forms into one or more fields based on a form data model. In one embodiment, the form data model is derived for the one or more classified fields, associated form post and the one-click checkout flow. In detail, the checkout data entry forms include various types of form fields. The form fields shape that area for data entry for the users. There are different types of fields such as single line or multiline text, password field, email field, telephone number field, date field, checkbox field, drop list field, list box field, CAPTCHA field, payment details field or the like. The checkout data entry form includes fields, and each field includes a field name and field type. The field type determines how a field is rendered in a form and how a field value is processed. The one or more fields enable to each field to share the property with other field. The classification of the checkout data entry forms may be many levels deep and wide depending on the complexity required. The compatibility of the classification module with one of the checkout models is identified in terms of the fields in the checkout form and restrictions in those fields. If the compatibility is not, then the classification module creates a new classification for that website and matches in the future with other websites during the classification.

Moreover, the classification module 90 is also configured to map user information with one or more classified fields using a natural language mapping technique to obtain a mapped model. In one embodiment, the user information to be mapped with the one or more classified fields may include at least one of personal information, shipping information, billing information and payment information. The natural language mapping technique understand the meaning of the one or more field and meaning of the user information and based on sematic and similarity analysis of the meaning, the natural language mapping technique enable the classification module to map the correct user information in the corresponding correct one or more fields. As used herein, the mapped model may be an address and payment model. For example, each website may have one or more fields for address such as site 1 may have address 1, city, state, zip. Site 2 may have Address 1, Address 2, City, State, Zip. Site 3 may have Address 1, Address 2, City, State, Zip and Country. Similarly, the site may support one or more payment methods such as credit card, debit cards and even in credit card some may accept only visa or master card. The address and payment model has to be classified and mapped correctly. In a specific embodiment, the classification module 90 is configured to map the one or more classified fields by a human overrider when an error occurs during automatic mapping.

Subsequently, the processing subsystem 40 includes a fingerprinting module 100 which is configured to fingerprint a plurality of configurations and a plurality of checkout pages of the corresponding one or more e-commerce websites to obtain fingerprinting data. As used herein, fingerprinting is the capability of a website to identify or re-identify a visiting user, user agent or device via configuration settings or other observable characteristics. The device fingerprint, machine fingerprint or browser fingerprint collect information about a remote computing device for the purpose of identification. The one or more websites use the information provided by browsers to identify unique users and track corresponding online behavior. In one embodiment, the fingerprinting module 100 is configured to identify cookies, CSRF (cross-site request forgery) tokens and artifacts required for checkout in the e-commerce website. The fingerprinting module 100 is also configured to manage session management, XSRF tokens, checkout session and security process to complete the tasks. Additionally, the processing subsystem 40 includes a checkout processing module 110 configured to generate a one-click checkout flow for an e-commerce website selected from the one or more e-commerce websites browsed by the web crawler 70. The one-click checkout flow is generated based on the fingerprinting data and the mapped model. In one embodiment, the checkout processing module 110 is configured to store the user information to enable one-click checkout flow for following transactions from corresponding user interface. More specifically, securely store the billing information, shipping information, shipping preferences and the like, so that the customer does not have to provide that next time when they checkout from the same device or another device. In a specific embodiment, the one-click checkout flow is executed in a batch mode at a scheduled time. The checkout processing module 110 is configured to fill a web based form for a user and make one or more API calls to the plurality of e-commerce websites to enable the one-click checkout flow. In such an embodiment, the one-click checkout flow is generated using a predetermined plugin library or the checkout processing module 100 is configured to create a request to write a plugin to support an unknown scenario.

In one embodiment, the checkout processing module 100 is configured to support a cart comprising a plurality of products from a plurality of merchants and break down one or more line items for the corresponding plurality of merchants. The checkout processing module 100 is further configured to transmit details of the plurality of products to an interface of the corresponding plurality of merchants via the one-click checkout flow. Furthermore, the checkout processing module 110 is configured to fill a web based form for a user and make one or more API calls to the plurality of e-commerce websites to enable the one-click checkout flow. More specifically, the checkout processing module 110 automatically fills out the web form for the customers and make the API calls to websites running on the major e-commerce platforms in such a way that user will be able to purchase from any website in one click.

Figure 2:
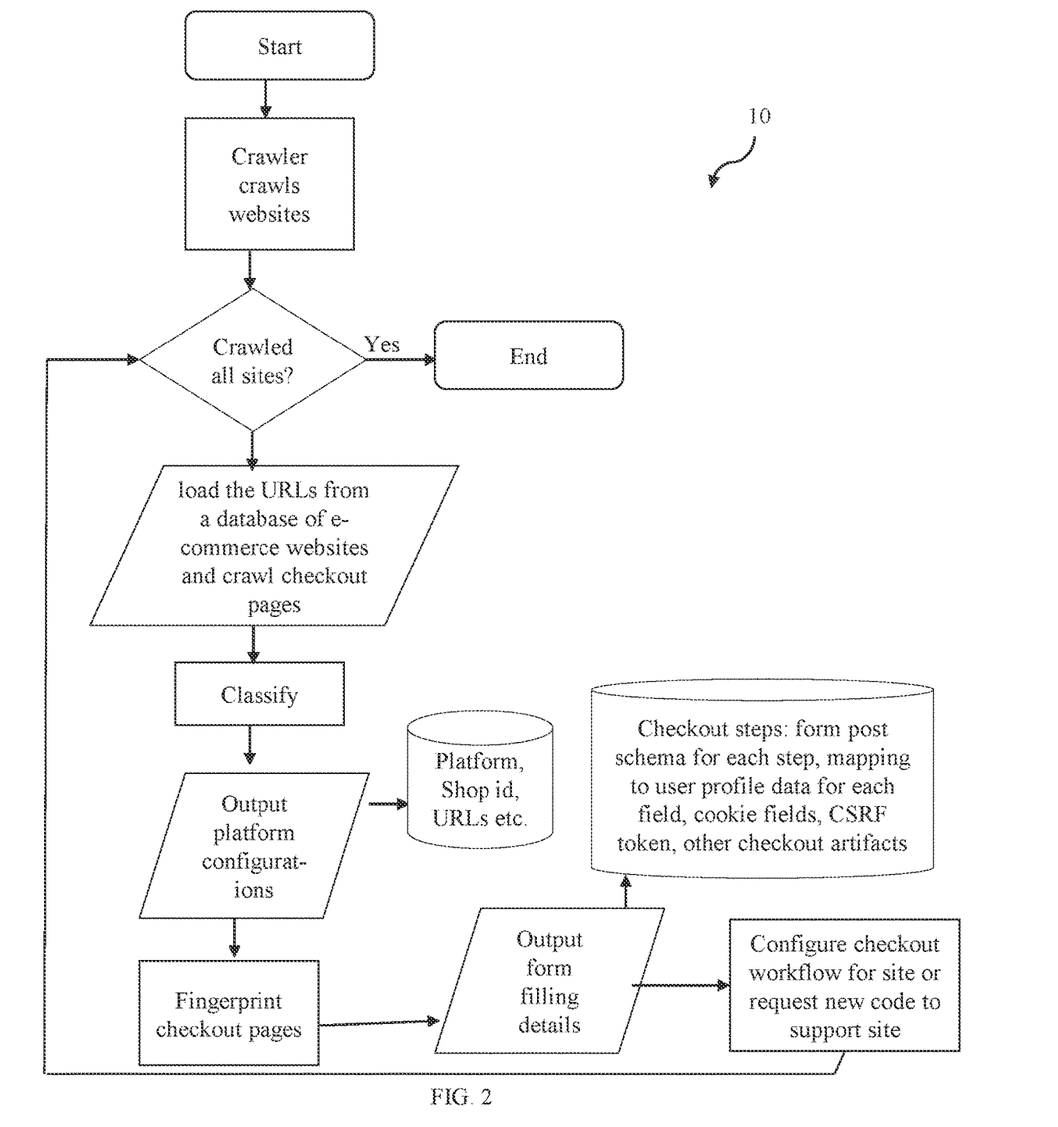
FIG. 2 is a block diagram representation of steps involved in operation of the system of FIG. 1 in accordance with an embodiment of the present disclosure.
Figure 3:
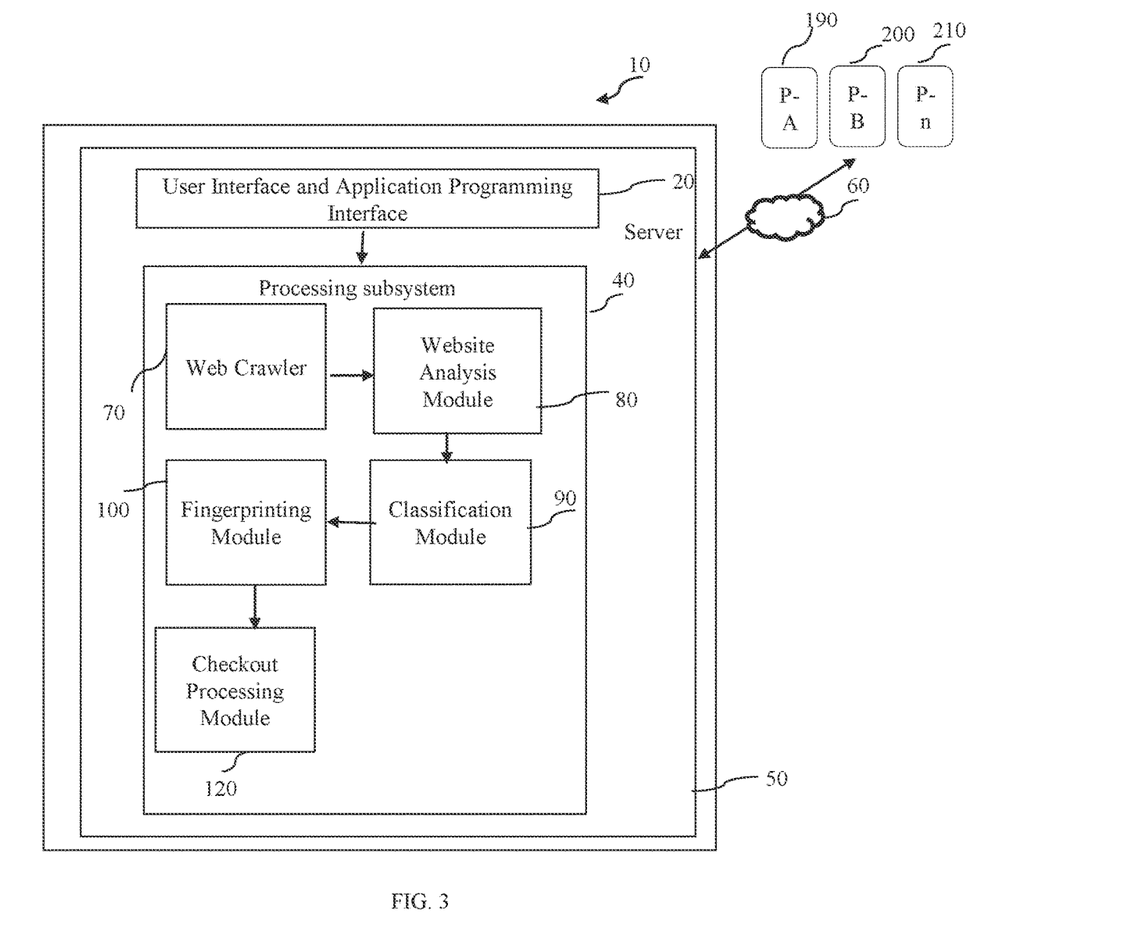
FIG. 3 is a schematic representation of an exemplary system of FIG. 1 in accordance with an embodiment of the present disclosure.

FIG. 2 and FIG. 3 illustrates an exemplary embodiment of the system of FIG. 1, wherein FIG. 2 depicting an exemplary system and FIG. 3 depicts a flow chart representing the streamlining of checkout process in accordance with an embodiment of the present disclosure. The checkout page is the most important page on an e-commerce website. Imagine adding a few items to a shopping cart and proceed to checkout only to be confused by lengthy form filling that never seems to end. Considering a non-limiting example where the system 10 communicates with 'n' e-commerce websites such as platform-A 190, platform-B 200 and platform-n 210 via a user interface and an application programming interface 20. The processing subsystem 40 of the system 10 is located on a cloud based server 50. The processing subsystem 40 leverage the web crawler 70 to enumerate the websites of interest. The processing subsystem 40 will decide which e-commerce technology that it is built with, fingerprint the site's configurations, fingerprint the site's checkout pages and configure the one-click checkout workflow for the website using the checkout processing module 110 for the major e-commerce platform (platform-A, platform-B and platform-n). This part of the process will run in batch mode at scheduled time. The website analysis module 80 standardizes a user profile schema for a customer's shipping info, billing info and payment details. During the fingerprinting off the checkout pages by the fingerprinting module 100, the classification module 90 identifies the form posts calls which needs to be making and maps the form posts fields to the standard user profile's fields. The matching logic is based on common natural language mapping. In case of an automatic classifier mapping error, the human overrider is used to map the fields properly.

During the checkout pages fingerprinting, the fingerprinting module 100 identities the cookies, CSRF tokens and other artifacts that are required to support for the checkout for a given platform. The outcome is either configuring a checkout workflow based on the existing plugin library or a request to write a new plugin to support the new scenario. For a given e-commerce technology platform, the modules are reusable and may be configured to support new experience. The web crawler 70 will be enhanced incrementally when new scenarios are learned.

FIG. 3 is a block diagram of a computer or a server 300 for system 10 in accordance with an embodiment of the present disclosure. The server includes processor(s) 310, and memory 320 operatively coupled to the bus 330.

The processor(s) 310, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 320 includes a plurality of subsystems and a plurality of modules stored in the form of executable program which instructs the processor 310 to perform the method steps illustrated in FIG. 1. The memory 320 is substantially similar to the system 10 of FIG. 1. The memory 320 has following subsystems: the processing subsystem 40 including the web crawler 70, the website analysis module 80, the classification module 90, the fingerprinting module 100 and the checkout processing module 110.

The processing subsystem 40 includes a web crawler 70 configured to systematically browse the one or more e-commerce websites. The processing subsystem 40 also includes a website analysis module 80 configured to analyze one or more checkout data entry forms and web UI of the corresponding one or more e-commerce websites browsed by the web crawler 70. The processing subsystem 40 further includes a classification module 90 configured to classify the one or more checkout data entry forms into one or more fields based on a form data model. The classification module 90 is also configured to map user information with one or more classified fields using a natural language mapping technique to obtain a mapped model. The processing subsystem 40 further includes a fingerprinting module 100 configured to fingerprint a plurality of configurations and a plurality of checkout pages of the corresponding one or more e-commerce websites to obtain fingerprinting data. The processing subsystem 40 further includes a checkout processing module 110 configured to generate a one-click checkout flow for an e-commerce website selected from the one or more e-commerce websites browsed by the web crawler, where the one-click checkout flow is generated based on the fingerprinting data and the mapped model.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 310.

Figure 4:
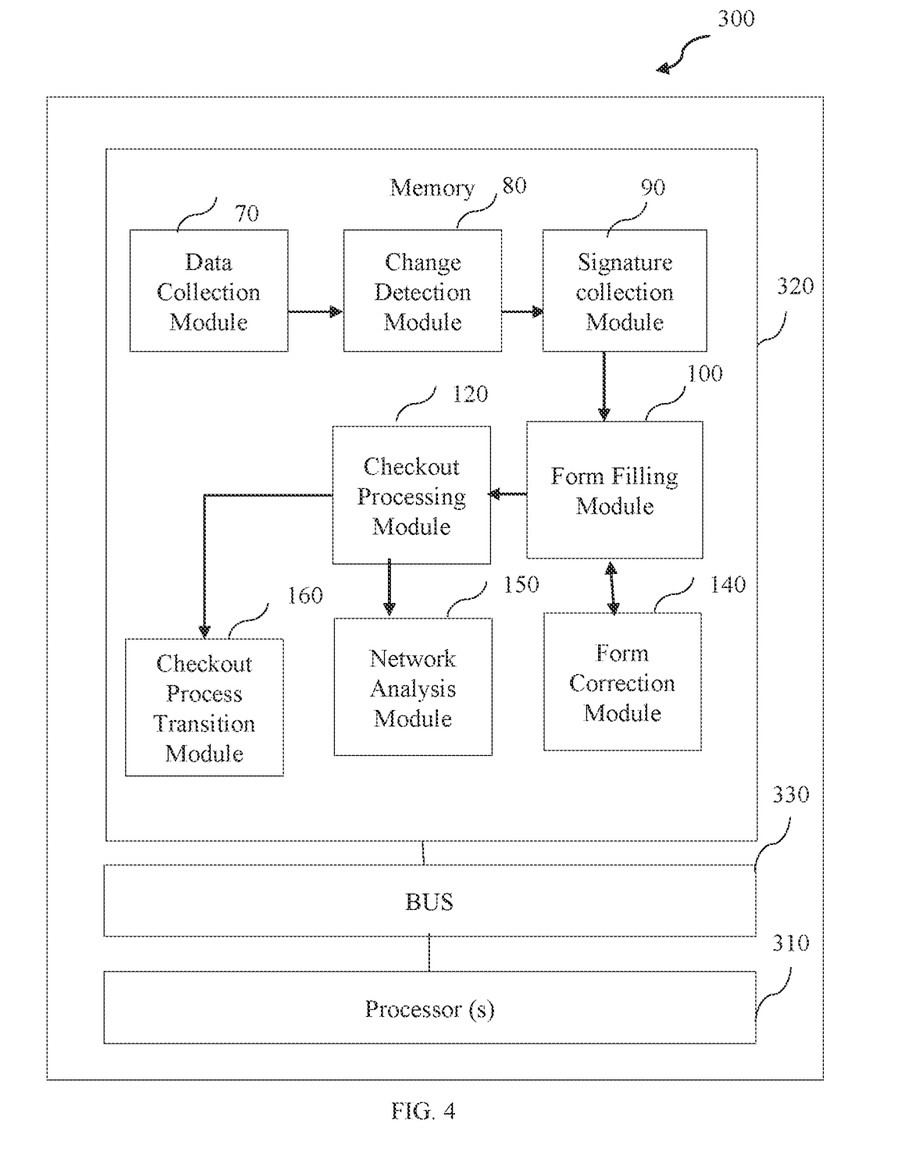
FIG. 4 is a block diagram of a computer or a server for system in accordance with an embodiment of the present disclosure.
Figure 5A:
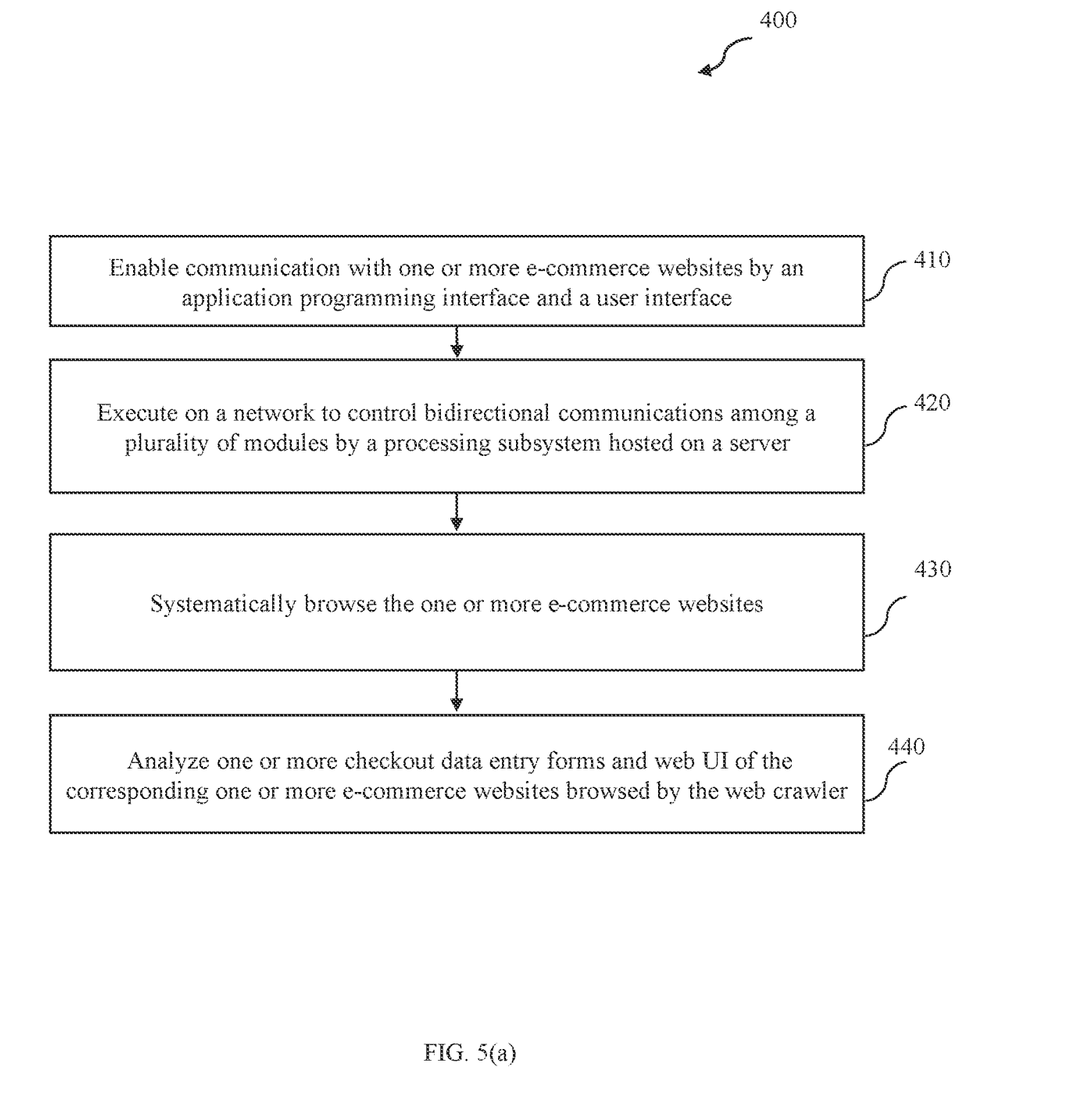
FIG. 5(a) illustrates a flow chart representing the steps involved in a method for streamlining the checkout process of e-commerce websites in accordance with an embodiment of the present disclosure.
Figure 5B:
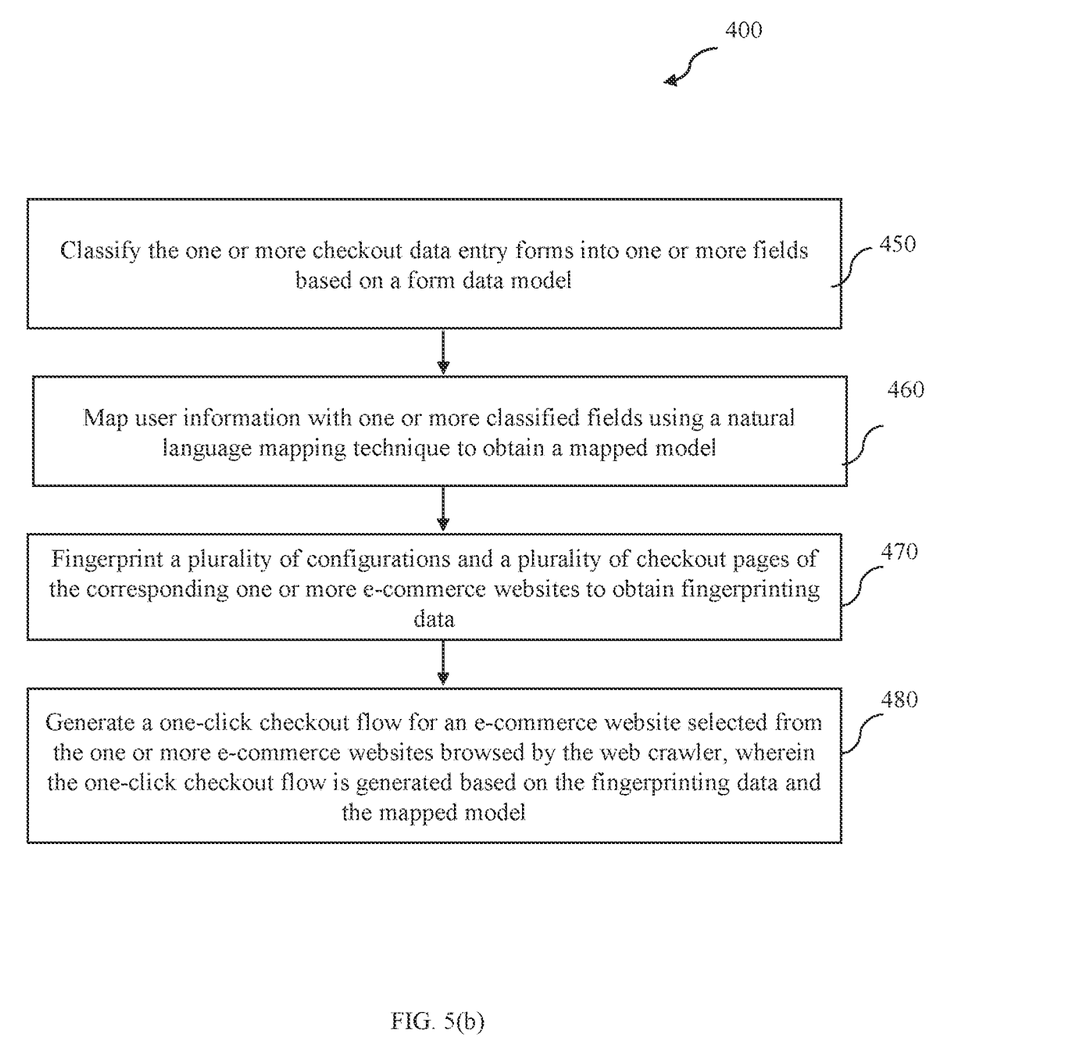
FIG. 5(b) illustrates continued steps of method of FIG. 5(a) in accordance with an embodiment of the present disclosure.

FIG. 4 is a flow chart representing the steps involved in a method 400 to streamline a checkout process of e-commerce websites in accordance with an embodiment of the present disclosure. The method 400 includes enabling communication with one or more e-commerce websites in step 410. In one embodiment, enabling communication with one or more e-commerce websites by a user interface and an application programming interface. The API defines the kinds of calls or requests which may be made, how to make them, the data formats that should be used, the conventions to follow, or the like. In one embodiment, the API may be remote APIs or web APIs. The method 400 also includes executing on a network to control bidirectional communications among a plurality of modules in step 420. In one embodiment, executing on a network may include executing on a network by a processing subsystem hosted on a server. In another embodiment, executing on a network to control bidirectional communications may include executing on a network to control bidirectional communications on a client server through the browser. The browser visits the e-commerce webpage through the network.

The method 400 further includes crawling the one or more e-commerce websites systematically in step 430. In one embodiment, crawling the one or more e-commerce websites systematically by a web crawler. In a specific embodiment, the web crawler is configured to load the URLs from a database of e-commerce websites and crawl checkout pages of the corresponding one or more e-commerce websites. The method 400 further includes analyzing one or more checkout data entry forms and web UI of the corresponding one or more e-commerce websites crawled by the web crawler in step 440. The website analysis module is also configured to analyze a type of content, fields and control configurations of the data entry form used at the time of check on the one or more e-commerce websites.

Moreover, the method 400 includes classifying the one or more checkout data entry forms into one or more fields based on a form data model in step 450. In one embodiment, classifying the one or more checkout data entry forms into one or more fields based on a form data model by a classification module. In one embodiment, the form data model is derived for the one or more classified fields, associated form post and the one-click checkout flow. In detail, the checkout data entry forms include various types of form fields. The form fields shape that area for data entry for the users. There are different types of fields such as single line or multiline text, password field, email field, telephone number field, date field, checkbox field, drop list field, list box field, CAPTCHA field, payment details field or the like. The method 400 further includes mapping user information with one or more classified fields using a natural language mapping technique to obtain a mapped model in step 460. In one embodiment, mapping user information with one or more classified fields by the classification module. In one embodiment, the user information to be mapped with the one or more classified fields may include at least one of personal information, shipping information, billing information and payment information. The natural language mapping technique understand the meaning of the one or more field and meaning of the user information and based on sematic and similarity analysis of the meaning, the natural language mapping technique enable the classification module to map the correct user information in the corresponding correct one or more fields. In a specific embodiment, the classification module is configured to map the one or more classified fields by a human overrider when an error occurs during automatic mapping.

The method 400 further includes fingerprinting a plurality of configurations and a plurality of checkout pages of the corresponding one or more e-commerce websites to obtain fingerprinting data in step 470. In one embodiment, fingerprint a plurality of configurations and a plurality of checkout pages of the corresponding one or more e-commerce websites to obtain fingerprinting data by a fingerprinting module. In one embodiment, the fingerprinting module is configured to identify cookies, CSRF (cross-site request forgery) tokens and artifacts required for checkout in the e-commerce website. The fingerprinting module is also configured to manage session management, XSRF tokens, checkout session and security process to complete the tasks.

In addition, the method 400 includes generating a one-click checkout flow for an e-commerce website selected from the one or more e-commerce websites browsed by the web crawler in step 480. The one-click checkout flow is generated based on the fingerprinting data and the mapped model. In one embodiment, generating a one-click checkout flow for an e-commerce website by a checkout processing module. In a specific embodiment, storing, by the checkout processing module, the user information to enable one-click checkout flow for following transactions from corresponding user interface. In such an embodiment, generating the one-click checkout flow comprises using a predetermined plugin library or creating a request to write a plugin to support an unknown scenario. In one embodiment, filling, by the checkout processing module, a web based form for a user and make one or more API calls to the plurality of e-commerce websites to enable the one-click checkout flow.

Various embodiments of the system and method to streamline a checkout process of e-commerce websites as described above enables less user interaction, less graphics, and less data are needed to finalize a purchase transaction once a user provides the indication that they want to purchase a product. The technical savings are usually obtained through the implementation of a different process between the time a user clicks on a button, hyperlink or drop down menu indicating a desire to make a purchase and actually processing the checkout page. In order to streamline the process for most e-commerce websites, the system is providing a technology that would analyze the checkout data entry forms of the major e-commerce platforms, classify the fields, and map them to the addresses and payment data model. The system will automatically fill out the form for the customers and make the API calls to websites running on the major e-commerce platforms in such a way that customers will be able to purchase from any website in one-click.

Furthermore, the system provides additional technical improvement which is the amount of memory needed both at the local client computer and the merchant server to manage the checkout processing. All of the necessary data is transmitted via the browser checkout request API without the need, again, of graphical interfaces to manually retrieve the data from the user. Thus, all of the memory previously required to manage multiple input screens with multiple input fields can be now free for other uses or remain unused and available, which can improve computer performance. Many people abandon the checkout process because the process is too difficult and because they do not want their credit personal/payment information spread around to too many merchant sites which can be hacked. Thus, a security saving can be realized because users will not need to input their personal information and/or private payment information in multiple merchant sites but can only store the payment data at the browser or other payment service which can send the information a single time for processing a purchase but prevent the information from being stored at the various merchant sites.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A system for streamlining a checkout process of one or more e-commerce websites comprising:

a user interface and an application programming interface configured to enable communication with the one or more e-commerce websites;
a processing subsystem hosted on a server and configured to execute on a network to control bidirectional communications among a plurality of modules comprising:
a web crawler configured to systematically browse the one or more e-commerce websites;
a website analysis module configured to analyze one or more checkout data entry forms and web UI of the corresponding one or more e-commerce websites browsed by the web crawler;
a classification module configured to:
classify the one or more checkout data entry forms into one or more fields based on a form data model;
map user information with one or more classified fields using a natural language mapping technique to obtain a mapped model;
a fingerprinting module configured to fingerprint a plurality of configurations and a plurality of checkout pages of the corresponding one or more e-commerce websites to obtain fingerprinting data; and
a checkout processing module configured to generate a one-click checkout flow for an e-commerce website selected from the one or more e-commerce websites browsed by the web crawler, wherein the one-click checkout flow is generated based on the fingerprinting data and the mapped model, wherein the one-click checkout flow is executed in a batch mode at a scheduled time.

2. The system of claim 1, wherein the user information to be mapped with the one or more classified fields comprises at least one of personal information, shipping information, billing information and payment information.

3. The system of claim 1, wherein the classification module is configured to map the one or more classified fields by a human overrider when an error occurs during automatic mapping.

4. The system of claim 1, wherein the checkout processing module is configured to:
support a cart comprising a plurality of products from a plurality of merchants and break down one or more line items for the corresponding plurality of merchants; and
transmit details of the plurality of products to an interface of the corresponding plurality of merchants via the one-click checkout flow.

5. The system of claim 1, wherein the checkout processing module is configured to store the user information to enable one-click checkout flow for following transactions from corresponding user interface.

6. The system of claim 1, wherein the fingerprinting module is configured to identify cookies, CSRF (cross-site request forgery) tokens and artifacts required for checkout in the e-commerce web site.

7. The system of claim 1, wherein the checkout processing module is configured to fill a web based form for a user and make one or more API calls to the plurality of e-commerce websites to enable the one-click checkout flow.

8. The system of claim 1, wherein the form data model is derived for the one or more classified fields, associated form post and the one-click checkout flow.

9. The system of claim 1, wherein the one-click checkout flow is generated using a predetermined plugin library or the checkout processing module is configured to create a request to write a plugin to support an unknown scenario.

10. A method comprising:
enabling, by a user interface and an application programming interface, communication with one or more e-commerce websites;
executing, by a processing subsystem hosted on a server, on a network to control bidirectional communications among a plurality of modules;
crawling, by a web crawler, the one or more e-commerce web sites systematically;
analyzing, by a website analysis module, one or more checkout data entry forms and web UI of the corresponding one or more e-commerce web sites crawled by the web crawler;
classifying, by a classification module, the one or more checkout data entry forms into one or more fields based on a form data model;
mapping, by the classification module, user information with one or more classified fields using a natural language mapping technique to obtain a mapped model;
fingerprinting, by a fingerprinting module, a plurality of configurations and a plurality of checkout pages of the corresponding one or more e-commerce web sites to obtain fingerprinting data; and
generating, by a checkout processing module, a one-click checkout flow for an e-commerce website selected from the one or more e-commerce websites browsed by the web crawler, wherein the one-click checkout flow is generated based on the fingerprinting data and the mapped model, wherein the one-click checkout flow is executed in a batch mode at a scheduled time.

11. The method of claim 10, comprising storing, by the checkout processing module, the user information to enable one-click checkout flow for following transactions from corresponding user interface.

12. The method of claim 10, comprising mapping, by the classification module, the one or more classified fields by a human overrider when an error occurs during automatic mapping.

13. The method of claim 10, comprising identifying, by the fingerprinting module, cookies, CSRF (cross-site request forgery) tokens and artifacts required for checkout in the e-commerce web site.

14. The method of claim 10, comprising to filling, by the checkout processing module, a web based form for a user and make one or more API calls to the plurality of e-commerce websites to enable the one-click checkout flow.

15. The method of claim 10, wherein generating the one-click checkout flow comprises using a predetermined plugin library or creating a request to write a plugin to support an unknown scenario.

* * * * *

UNITED STATES PATENT AND TRADEMARK OFFICE
CERTIFICATE OF CORRECTION

| | |
|---|---|
| PATENT NO. | : 11,532,023 B2 |
| APPLICATION NO. | : 17/183402 |
| DATED | : December 20, 2022 |
| INVENTOR(S) | : Kumar N. Senthil et al. |

It is certified that error appears in the above-identified patent and that said Letters Patent is hereby corrected as shown below:

On the Title Page

Item (12) delete "Senthil" and insert --Senthil et al.--.

Please add as second Inventor, Stella Rowlett, Redmond, WA (US).

Signed and Sealed this
Twenty-fourth Day of January, 2023

Katherine Kelly Vidal
*Director of the United States Patent and Trademark Office*